United States Patent [19]
Winter

[11] Patent Number: 6,112,353
[45] Date of Patent: Sep. 5, 2000

[54] DOCK LEVELER LIP ACTUATING MECHANISM

[75] Inventor: Bruce R. Winter, Muskego, Wis.

[73] Assignee: Overhead Door Corporation, Dallas, Tex.

[21] Appl. No.: 09/019,481

[22] Filed: Feb. 5, 1998

[51] Int. Cl.[7] ...................................................... E01D 1/00
[52] U.S. Cl. .............................. 14/71.3; 14/69.5; 14/71.1
[58] Field of Search .................................. 14/69.5, 71.1, 14/71.3, 71.5, 71.7

[56] References Cited

U.S. PATENT DOCUMENTS

| | | | |
|---|---|---|---|
| Re. 30,104 | 10/1979 | Burnham | 14/71.3 |
| 3,203,002 | 8/1965 | McGuire | 14/71 |
| 3,500,486 | 3/1970 | Le Clear | 14/71 |
| 3,606,627 | 9/1971 | Potter | 14/71 |
| 4,047,258 | 9/1977 | Burnham | 14/71.3 |
| 4,091,488 | 5/1978 | Artzberger | 14/71.7 |
| 4,402,100 | 9/1983 | Slusar | 14/71.3 |
| 4,718,136 | 1/1988 | Fisher et al. | 14/71.3 |
| 4,937,906 | 7/1990 | Alexander | 14/71.1 |
| 5,088,143 | 2/1992 | Alexander | 14/69.5 |
| 5,323,503 | 6/1994 | Springer | 14/71.3 |
| 5,475,888 | 12/1995 | Massey | 14/69.5 |
| 5,553,343 | 9/1996 | Alexander | 14/71.1 |
| 5,586,356 | 12/1996 | Alexander | 14/71.1 |
| 5,832,554 | 11/1998 | Alexander | 14/71.1 |

*Primary Examiner*—Thomas B. Will
*Assistant Examiner*—Gary S. Hartmann
*Attorney, Agent, or Firm*—Akin, Gump, Strauss, Hauer & Feld, L.L.P.

[57] ABSTRACT

A dock leveler lip extension mechanism includes a bellcrank pivotally mounted on the leveler ramp and connected to a pull chain, a pushrod for extending the lip and to a counterbalance spring assembly at spaced apart points on the bellcrank. The bellcrank is pivotally mounted on a compensating link connected to a member which is connected to the leveler frame. Upon raising the ramp to the inclined position, the pull chain rotates the bellcrank to extend the lip with the assistance of the counterbalance spring and the compensating link moves to maintain or increase the counterbalance spring force to compensate for changing lip extension force requirements. A lip latch includes a latch link pivotally mounted on a lip moment arm or on the underside of the leveler ramp and supporting a latch member which is yieldably biased into engagement with a latch pin when the lip is moved to the extended position to hold the lip in the extended position until it engages a vehicle loadbed. A bias spring interconnects the latch member with the latch link to allow the latch member to disengage from the latch pin if a substantial unwanted force is exerted on the lip.

28 Claims, 10 Drawing Sheets

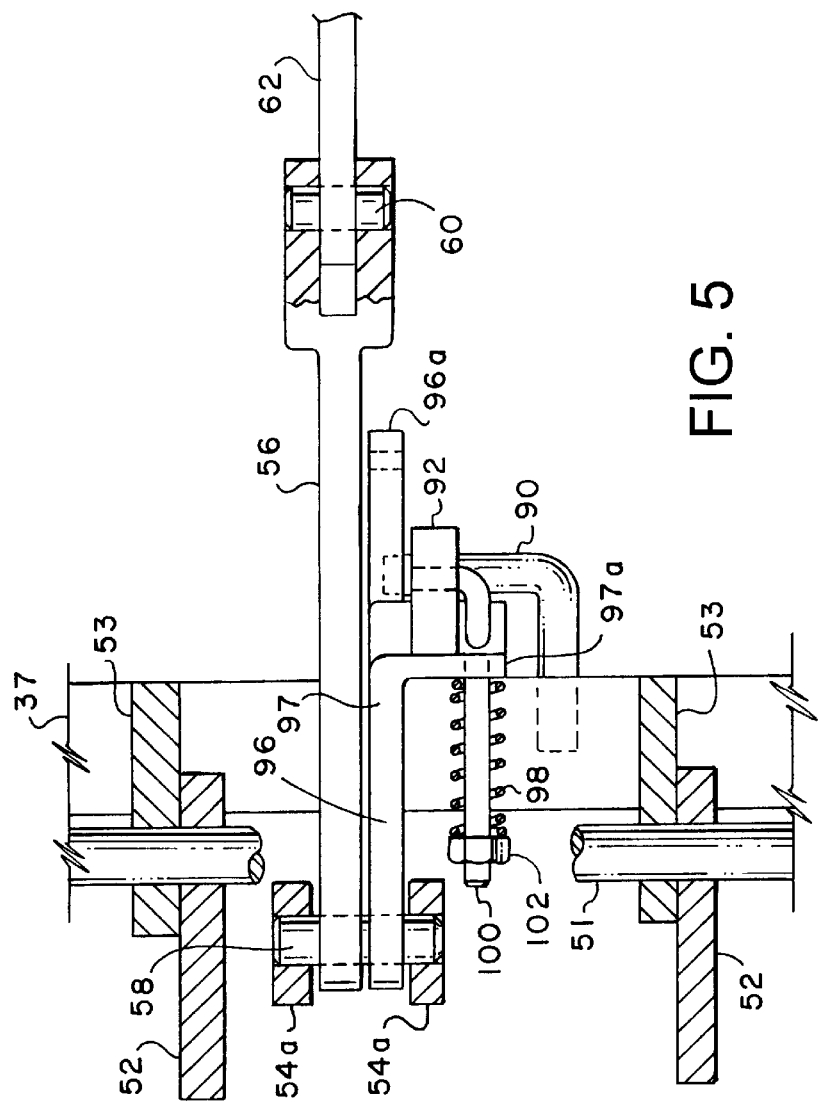
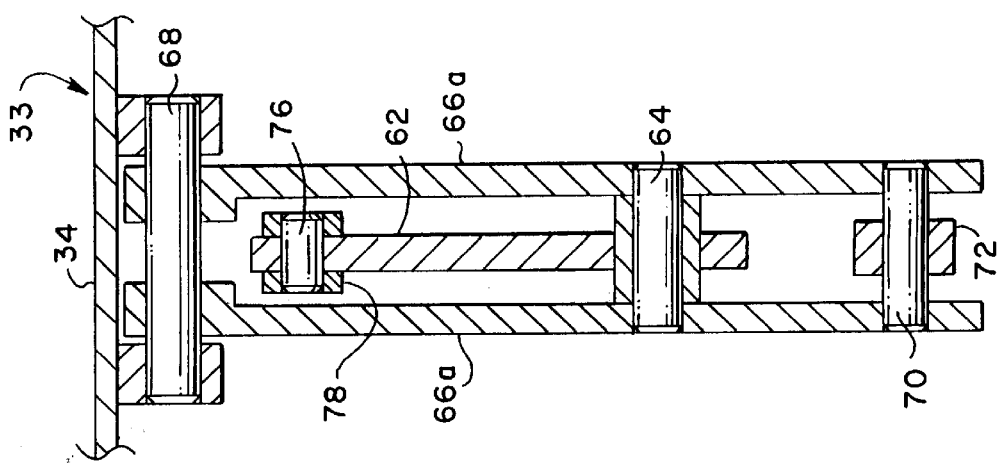
FIG. 5
FIG. 4

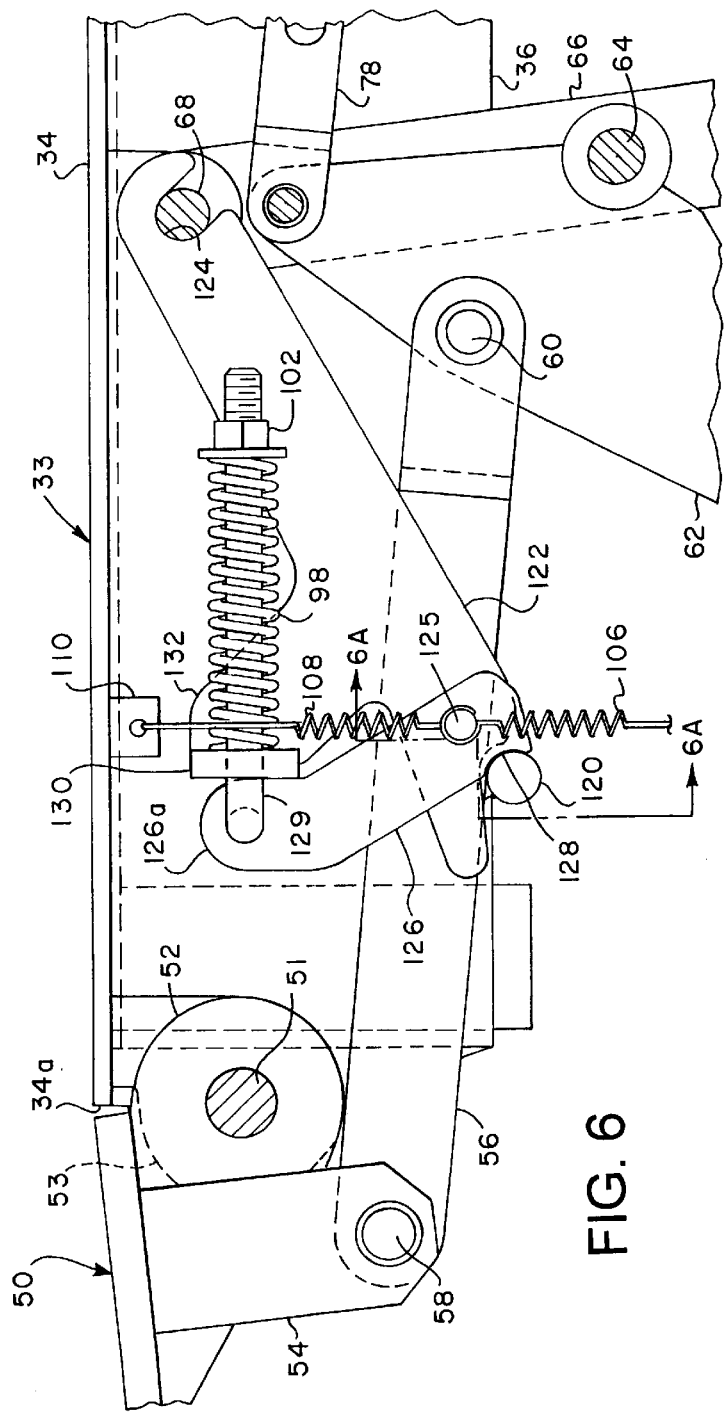
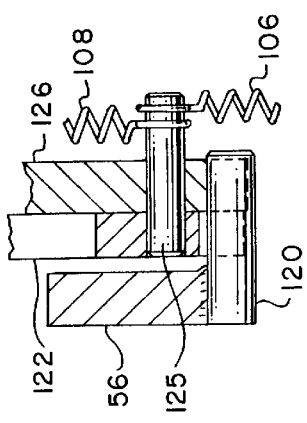
FIG. 6A
FIG. 6

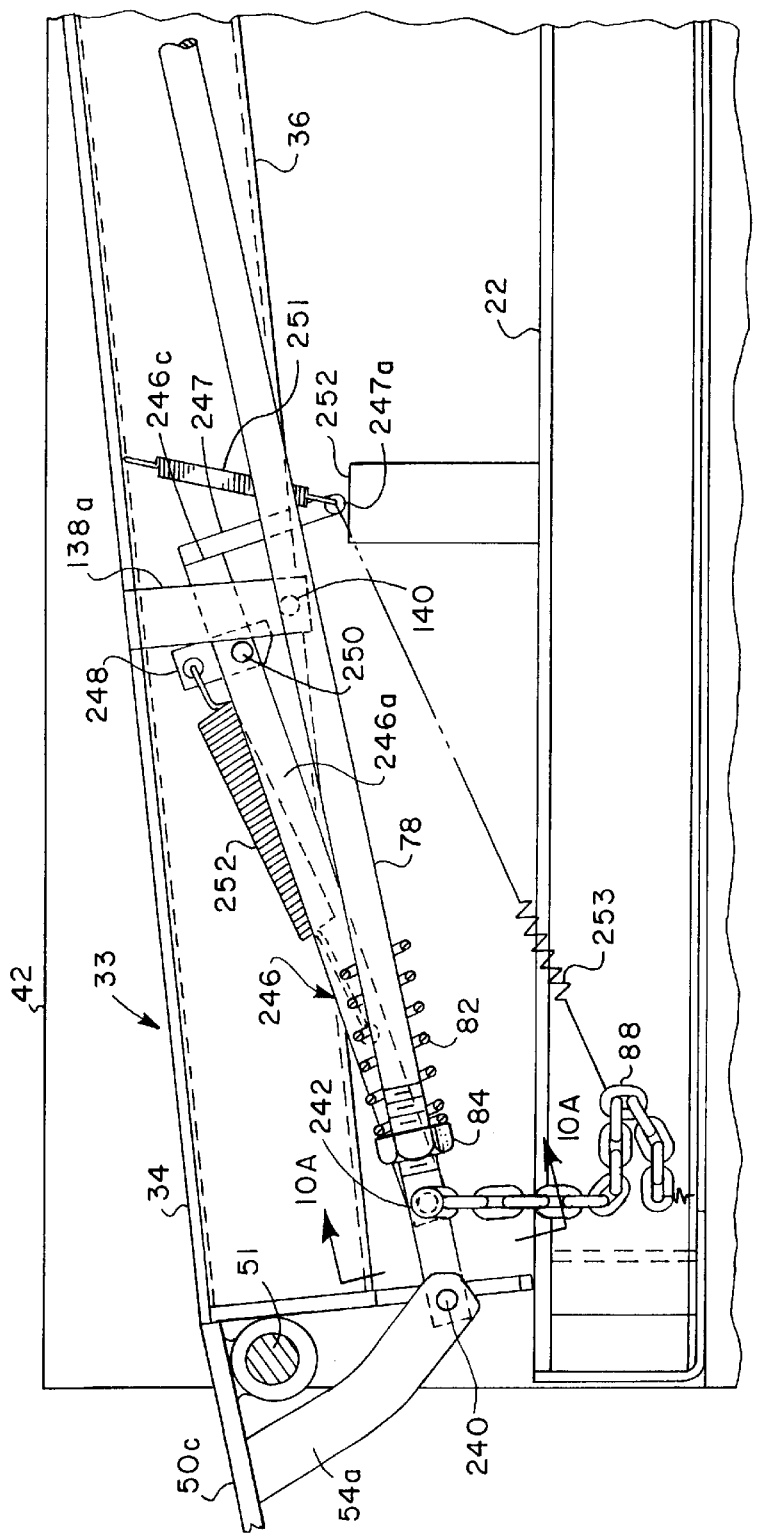
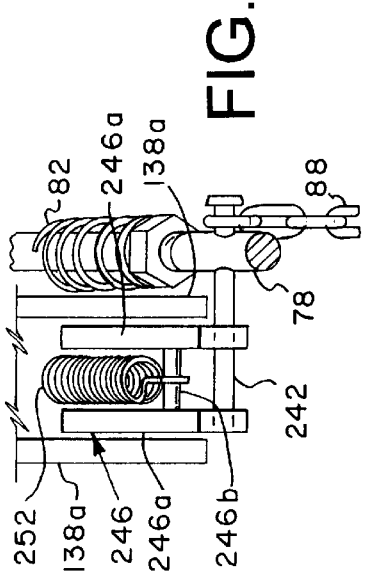
FIG. 10
FIG. 10A

DOCK LEVELER LIP ACTUATING MECHANISM

FIELD OF THE INVENTION

The present invention pertains to a loading dock leveler lip actuating and latching mechanism.

BACKGROUND

In the art of loading dock leveler apparatus, there have been several efforts to develop mechanisms for actuating the hinged extension member or so-called "lip" mounted on the distal end of the leveler ramp to place the lip in its working position for engagement with the loadbed of a truck or other vehicle. Typically, when the dock leveler ramp is raised to an inclined position preparatory to engaging the vehicle loadbed, the extension member or lip is moved from a pendant position to an extended position to serve as part of the leveler ramp surface.

One problem associated with prior art dock levelers pertains to the substantial actuating forces required to extend the lip member when the dock leveler ramp is raised to an inclined position. When the ramp is moved to an inclined position and the lip member is to be moved from its pendant position to its extended position the location of the center of gravity of the lip member with respect to its pivot connection to the ramp changes in such a way that substantial actuating forces are required to move the lip member to its extended position. This problem is aggravated by the need to provide, depending on the application of the dock leveler, lip members of varying widths and, accordingly, weights.

Although many prior art dock levelers include lip extension mechanisms with counterbalance springs associated therewith to assist in moving the lip to its extended position, heretofore the counterbalance mechanisms of prior art dock levelers have not been suitable for compensating for the increase in the actuating forces required to extend the lip member during raising of the ramp or to adequately compensate for lip members of different sizes and weights. Accordingly, it has been necessary to provide prior art dock levelers with ramp actuator devices which are of greater power capacity and strength than is desired, just to provide the capability of extending the lip member when the ramp is raised to its inclined position.

Still further, it has been considered desirable to provide a mechanism for actuating the lip which will maintain the lip in its extended position preparatory to engagement with the vehicle loadbed but also release the lip to decline to its pendant position once the vehicle has pulled away from the dock leveler. Positive mechanical latching mechanisms are desirable as compared with hydraulic dashpot or retarder mechanisms in that the latter type of mechanism is sensitive to substantial temperature variations which may be encountered in outdoor installations of loading dock levelers.

The present invention overcomes the above-mentioned problems with prior art dock leveler lip actuating mechanisms and provides additional desired features which will be appreciated by those skilled in the art.

SUMMARY OF THE INVENTION

The present invention provides an improved actuating mechanism for the lip extension member of a dock leveler. The present invention also provides an improved lip latching mechanism for latching the lip extension member in its working position.

In accordance with an important aspect of the present invention, a dock leveler lip actuating mechanism is provided which is operable to exert a substantial lip lifting force as the lip moves from a pendant position to a fully extended position. The lip actuating mechanism includes a linkage which is operably connected to a counterbalance spring to exert a counterbalance or lip extending force and the linkage is mounted for movement to maintain the counterbalance force at a significant value to extend the lip as the dock leveler moves to a preparatory and/or working position. The lip actuating mechanism provides a significant lip actuating or lifting force without requiring additional capacity of the dock leveler ramp raising mechanism and is operable to provide significant lifting forces for a variety of lip members of different sizes and weights.

In accordance with another important aspect of the invention, a dock leveler lip actuating mechanism is provided which includes a latch device which mechanically latches the lip in its extended position but is also operable to release the lip after the lip has engaged a loadbed or if the lip should, while extended, be accidentally forcibly engaged by a moving vehicle, for example. Several embodiments of the latching mechanism are provided by the invention to accommodate various design characteristics of dock levelers and to provide for releasing the lip to move to the pendant position after it has engaged a loadbed or in response to movement of the dock leveler to the "below dock" position.

Those skilled in the art will further appreciate the features and advantages of the present invention upon reading the detailed description which follows in conjunction with the drawing.

BRIEF DESCRIPTION OF THE DRAWING

FIG. 4 is a section view taken from the Line 4—4 of FIG. 3;

FIG. 5 is a detail view of the latch arm and latch member taken from the Line 5—5 of FIG. 3;

FIG. 6 is a view similar to FIG. 3 showing a first alternate embodiment of a lip latch mechanism in accordance with the invention;

FIG. 6A is a detail section view taken along line 6A—6A of FIG. 6;

FIG. 7A is a section view taken along line 7A—7A of FIG. 7;

FIG. 8A is a section view taken from line 8A—8A of FIG. 8;

FIG. 8B is a section view taken from line 8B—8B of FIG. 8;

FIG. 10 is a view similar to FIG. 9 showing a fifth alternate embodiment of a latching mechanism;

FIG. 10A is a view taken from line 10A—10A of FIG. 10; and

DESCRIPTION OF THE PREFERRED EMBODIMENTS

Figure 1:
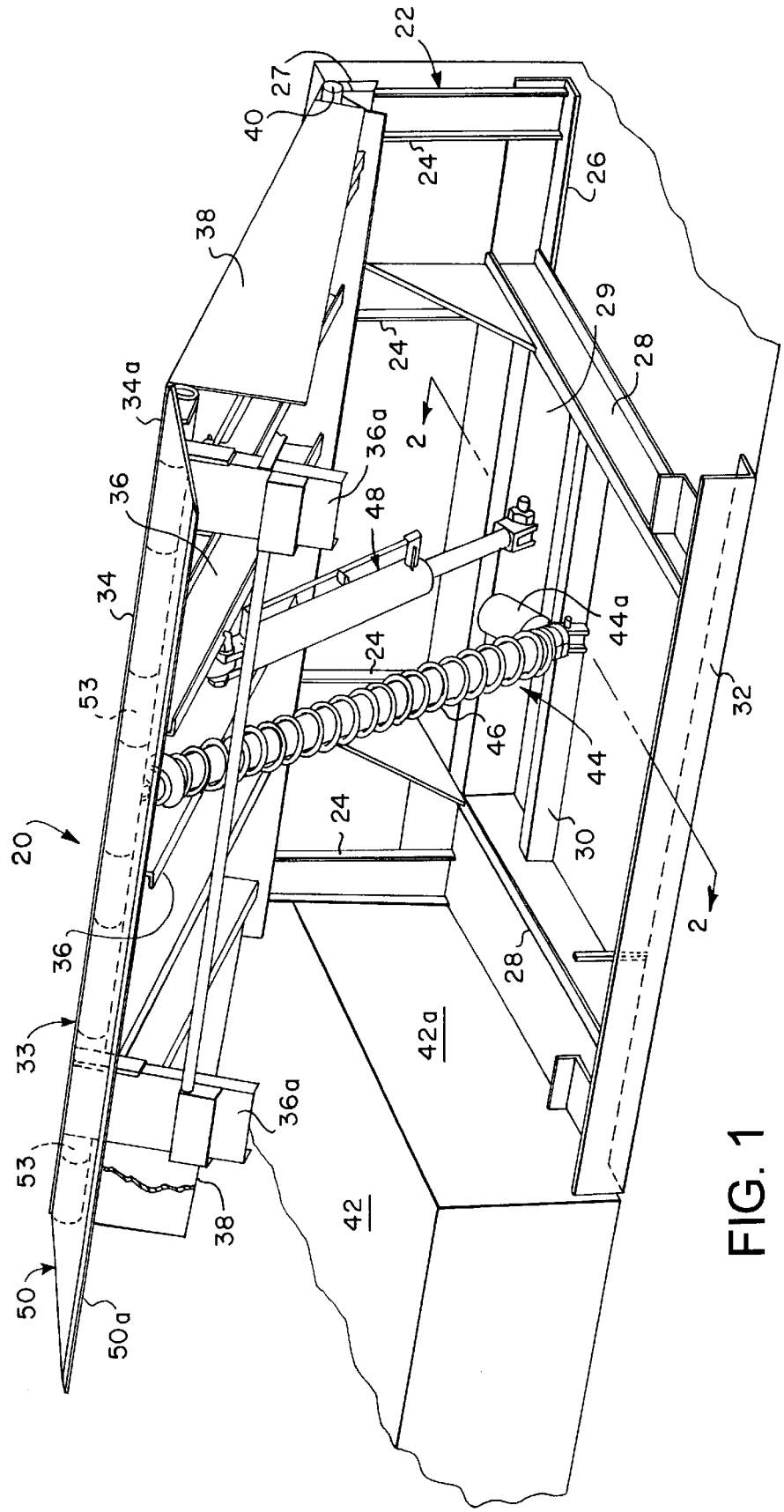
FIG. 1 is a perspective view of a loading dock leveler including the lip actuating mechanism of the present invention.

In the description which follows, like parts are marked throughout the specification and drawing with the same reference numerals, respectively. The drawing figures are not necessarily to scale. Certain features of the invention may be shown in somewhat schematic or generalized form in the interest of clarity and conciseness and certain conventional components may be omitted from some of the drawing figures, also in the interest of clarity.

Referring to FIG. 1, there is illustrated a dock leveler in accordance with the invention and generally designated by the numeral 20. The dock leveler 20 is characterized by a frame 22 including spaced apart upstanding column members 24 interconnected by transverse members 26 and 27 and suitably secured thereto, such as by welding. Laterally extending beam members 28 are connected to the member 26 and to each other by spaced apart transverse beams 29, 30 and 32. The frame 22 supports a dock leveler ramp 33 comprising a generally rectangular flat deck plate 34 which is reinforced by spaced part longitudinal beams 36 suitably secured to the deck plate by welding, for example. Spaced apart end skirts 38 are also secured to the deck plate 34 and depend therefrom. The ramp 33, comprising the deck plate 34, beams 36 and skirts 38, is suitably hinged to the frame 22 in a conventional manner by hinge means 40 whereby the ramp may be moved between the inclined position shown and a below-dock level position, not shown in FIG. 1. Typically, the ramp 33 is stored in a position which will permit cross-traffic over the deck plate 34 along a dock 42. Suitable cross-traffic support legs 36a are connected to the ramp 33 for supporting the ramp in the stored, cross-traffic position. The exemplary dock leveler 20 illustrated is operable to be disposed in a recess or pit 42a of dock 42 and ramp 33 moved to an inclined position by an actuator 44 which may include an electric motor 44a driving a rotatable screw, not shown, and assisted by a counterbalance spring 46 sleeved over the actuator as illustrated. The actuator 44 may be of a type disclosed in U.S. patent application Ser. No. 08/714,853, filed Sep. 17, 1996 by Thomas M. DiSieno, et al. and assigned to the assignee of the present invention. The actuator mechanism for the dock leveler 20 may include a hydraulic cylinder type motion retarder 48 interconnecting the frame 22 with the ramp 33, as illustrated. Alternatively, the motion retarder 48 may be connected to a source of hydraulic fluid to act as the actuator for raising the dock leveler to its inclined position, as shown. Other types of actuating mechanisms may be utilized including linkages connected to mechanical springs which have sufficient actuating forces to elevate the ramp 33 upon being released from a held-down position in accordance with prior art dock levelers known to those skilled in the art. An example of a dock leveler having a mechanical actuating mechanism of the general type described above is disclosed in U.S. Pat. No. 3,882,563, issued May 13, 1975 to Smith et al.

The dock leveler 20 includes a ramp extension member or "lip" 50 comprising a generally rectangular flat reinforced plate which is hingedly connected to the distal end 34a of the ramp 33 to provide a smooth continuous surface for transport of goods between a loadbed or deck of a vehicle, not shown, and the dock 42. The lip member 50 is typically stored in a depending or pendant position when the ramp 33 is declined to the stored or cross-traffic position with the deck plate 34 generally flush or coplanar with the dock surface 42. The lip member 50 may be of various selected widths, that is the dimension between the hinge connection at the distal end 34a and the distal end 50a of the lip member to accommodate different loading dock requirements. Lip members of substantial width are, of course, heavier and require more actuating force to be moved from the pendant position to the extended position shown in FIG. 1, than lip members of reduced width between the ends 50a and 34a. When the ramp 33 is raised to the inclined position shown, the lip 50 is extended so that when the ramp is lowered to a working position, the lip will engage the loadbed of the vehicle to be accessed over the dock leveler. However, when the vehicle has been moved out of engagement with the dock leveler, the lip 50 is preferably stored in a depending or pendant position substantially perpendicular to the plane of the deck plate 34.

Figure 2:
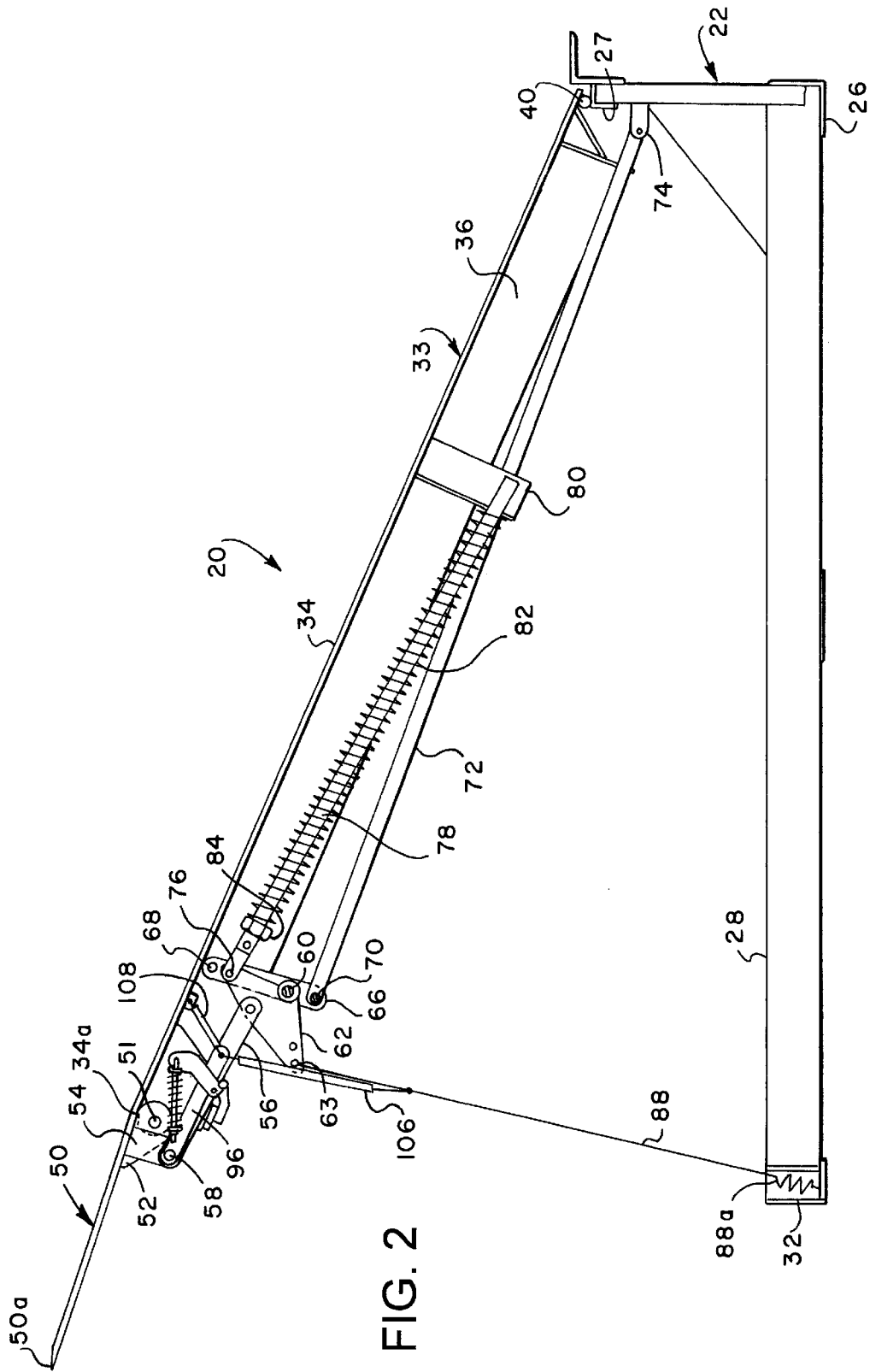
FIG. 2 is a view taken substantially from the Line 2—2 of FIG. 1.
Figure 3:
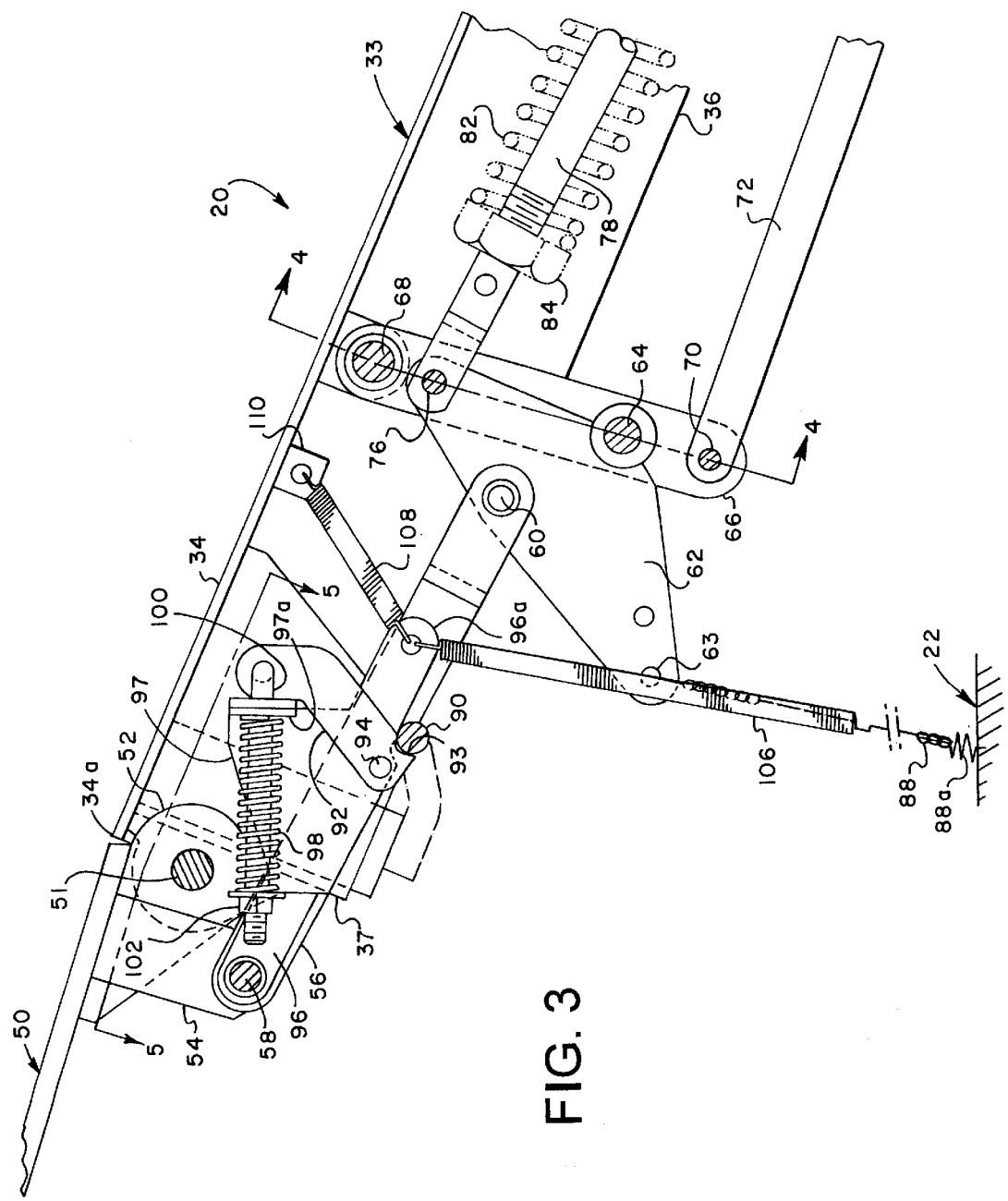
FIG. 3 is a detail view similar to FIG. 2 on a larger scale showing features of the lip lifting compensating linkage and latch mechanism.

Referring to FIG. 2 also, the lip 50 is suitably connected to the distal end of the ramp 33 by hinge means including an elongated hinge pin 51 and cooperating spaced apart hinge members 52, one shown connected to the underside of the lip and spaced apart hinge members 53, see FIG. 1, on the ramp 33. The lip 50 is connected to an actuating mechanism including an arm 54 comprising two closely spaced members 54a, see FIG. 5, secured to the underside of the lip and extending substantially perpendicular to the plane of the lip as shown in FIGS. 2 and 3. The arm 54 is connected to an elongated pushrod link 56 by a suitable pivot pin 58. The opposite end of the arm 56 is pivotally connected at 60 to a bellcrank member 62 which, in turn, is connected by pivot means 64 to a link 66 depending from the underside of the deck plate 34. The link 66, comprising spaced link members 66a, is pivotally connected to the ramp 33 at a pivot pin 68, see FIGS. 3 and 4 also. The end of the link 66 opposite the pivot connection 68 is provided with a pivot pin 70 for connection to an elongated actuating rod 72, the opposite end of which is pivotally connected to the frame 22 at a pivot connection 74, FIG. 2. Certain components, such as the actuator 44 and motion retarder 48, have been eliminated from FIG. 2 and the lip actuating mechanism described herein has been eliminated from FIG. 1, in the interest of clarity.

Referring to FIGS. 3, 4 an 5, the bellcrank 62 is also operably connected at a pivot pin 76 to an elongated rod 78 which extends through a suitable bore formed in a depending frame member 80, FIG. 2, and is slidably disposed relative to the frame member. An elongated coil spring 82 is sleeved over the rod 78 and is trapped between the frame member 80 and an adjustment nut 84 threadedly engaged with the rod 78. Adjustment of the axial position of the nut 84 on the rod 78 will allow extension or require compression of the spring 82 and thus adjust a force acting on the bellcrank 66 by the rod 78. Accordingly, the spring 82 is operable to counterbalance the tendency for the lip 50 to rotate toward the pendant position and reduce the lip extension forces required when the ramp is raised to the position shown in FIGS. 2 and 3, for example.

Referring to FIGS. 2 and 3, the bellcrank 62 is connected at a point 63 spaced from the pivot 60 and also spaced from the pivot 64, to an elongated flexible cable or chain 88 which is attached at the opposite end to the frame 22. A coil spring 88a is preferably interposed between the end of the chain 88 attached to the frame 22 and the actual point of attachment of the chain to the frame to prevent damage to the chain or the bellcrank 62 when the ramp 33 is raised above a maximum preparatory inclined position. Accordingly, when the ramp 33 is raised to the position shown in FIG. 2, the chain 88 will become taut and the bellcrank 62 will be rotated in a counterclockwise direction about the pivot 64 to cause the link 56 to extend the ramp 50 to the position shown in FIGS. 2 and 3.

Prior to movement of the bellcrank 62 as described above, and with the lip 50 in a pendant position, the bellcrank 62 will have rotated from the positions shown in FIGS. 2 and 3 in a clockwise direction approximately ninety degrees. With the bellcrank 62 in the position rotated ninety degrees from that shown in FIGS. 2 and 3, the counterbalance spring 82 will be compressed so that a substantial counterbalance force is provided when the moment arm between the pivots 64 and 60 is less than that provided for in the position shown in FIGS. 2 and 3. Accordingly, as the bellcrank 62 rotates from the position corresponding to the pendant position of the lip 50 to the position shown in FIGS. 2 and 3, the spring force exerted on the bellcrank will progressively diminish, but the moment arm of the bellcrank acting on the link 56 will also increase to partially compensate for the decreased force.

Even though the moment arm of the bellcrank 62 acting on the link 56 may increase through a portion of the arc of rotation of the bellcrank, the moment arm between the pivots 51 and 58 is changing and is tending to decrease as the lip 50 moves toward its extended position. Moreover, as the ramp 33 is moving toward its inclined position the force required to extend the lip 50 from its pendant position toward its extended position tends to increase significantly. However, the arrangement of the link 66, the bellcrank 62 and the counterbalance spring and rod assembly 78, 82 moves in such a way, during movement of the ramp 33 to the inclined position, that the counterbalance force exerted by the spring 82 may actually increase or at least remain substantially constant even though the bellcrank 62 is being rotated in a counterclockwise direction about the pivot 64. The arrangement of the compensating link 66 and rod 72 requires the link 66 to rotate in a counterclockwise direction as the ramp 33 is moved to its inclined position thus tending to keep the counterbalance spring 82 from relaxing as much as it would if the bellcrank 62 were mounted for rotation about a fixed position on the ramp 33.

Accordingly, as the ramp 33 is moved toward an inclined position and the forces required to move the lip 50 to its extended position becomes substantial, the arrangement of the link 66 with its actuating rod 72 and the bellcrank 62 mounted on the link 66, together with the arrangement of the counterbalance spring 82 and its actuating rod 78, operate together to provide a significant counterbalance force exerted on the link 56 as it moves the lip toward its extended position. A substantial counterbalance or assist force is thus exerted on the lip 50 in a way which is operable to reduce the power requirements of the ramp actuator 44, for example, and provides for a greater range of suitable counterbalance forces to be exerted for lips of different widths and weights. Further adjustment of the counterbalance forces acting through the bellcrank 62 may, of course, be obtained by adjusting the position of the nut 84 on the counterbalance rod 78.

Accordingly, by providing the compensating link 66 mounted for pivotal movement on the ramp 33 in response to moving the ramp to its inclined position and being adapted to support the bellcrank 62 in the manner described above, a lip compensating or counterbalance force is provided to meet the lip actuating force requirements which change as the position of the ramp 33 and lip 50 change during movement toward the ramp inclined position. Still further, the arrangement of the bellcrank 62, link 66, and rod 72 generates at least a minor actuating force to assist in moving the ramp 33 to its inclined position, particularly as the ram approaches the inclined position due to forces acting on the link 66. This actuating force is due to the weight of the lip 50 acting on the bellcrank 62 through link 56 and the force transferred from the bellcrank 62 to link 66 and rod 72.

Referring further to FIGS. 3 through 5, the lip actuating mechanism of the present invention includes an improved latch mechanism which retains the lip 50 in its extended position after being moved there by the above-described mechanism. As shown in FIG. 3 and also FIG. 5, a depending bracket member 37 is provided on the underside of ramp 33 spaced from and below the deck plate 34 and is suitably secured to the deck plate or to one of the beams 36. The bracket 37 supports a stop pin 90 which is engageable by a spring biased latch member 92 at a surface 93 on the latch member. The latch member 92 is mounted on a pivot pin 94 which is connected to a link 96 pivotally mounted on the lip 50 at the pivot 58. A bracket part 97 of the link 96 supports a coil compression spring 98 thereon together with an elongated threaded rod 100 and a spring force adjustment nut 102 threadedly engaged with the rod. The end of the rod 100 opposite that connected to the nut 102 is connected to the latch member 92 and extends through a suitable bore in a flange 97*a* of the bracket part 97.

As shown in FIG. 3, when the lip 50 is in the extended position, the latch member 92 is engaged with the pin 90 to hold the lip extended regardless of the inclined position of the ramp 33. In fact, when the ramp 33 is moved about the hinge 40 from a maximum inclined or so-called preparatory position, to a working position (in a counterclockwise direction, viewing FIG. 2), the lip 50 would, without the latch described above, begin to decline as the tension in the chain 88 was relaxed and the bellcrank 62 was allowed to rotate in a clockwise direction about its pivot 64 even with a substantial counterbalance force being exerted on the bellcrank by the spring 82. However, the latch mechanism described hereinabove maintains the lip 50 in its extended position until it engages a loadbed of a vehicle to be loaded or unloaded over the dock leveler 20. Operation of the latch comprising the member 92 and the link 96 is also provided for by tension springs 106 and 108 which are, respectively, connected to a distal end 96*a* of the link 96. Spring 106 is connected at its opposite end to the chain 88 and spring 108 is connected at its opposite end to the ramp 33 at a boss 110, as shown.

Accordingly, when the ramp 33 is being moved to the inclined position and the lip 50 is being extended to the position shown in FIG. 3, the spring 106 is tensioned to pull the link 96 in a clockwise direction about its pivot 58 into engagement of the latch member 92 with the stop pin 90. When the tension in the spring 106 is relaxed as a result of the ramp 33 being moved back down toward its working position, the latch member 92 will remain engaged with the pin 90 due to a substantial force being exerted thereon by the lip 50 which tends to rotate in a counterclockwise direction, viewing FIG. 3, about its hinge pin 51. Under these circumstances the spring 108 is under some tension and a force is exerted on the distal end of the link 96 tending to rotate it in a counterclockwise direction about the pivot 58. However, this spring force is not sufficient to cause the latch 92 to disengage from the pin 90. When the lip 50 moves into contact with a vehicle loadbed and the weight of the lip tending to rotate it in a counterclockwise direction, viewing FIG. 3, is diminished substantially, the force acting on the latch mechanism including the member 92 is relaxed and the spring 108 will move the link 96 to disengage the latch member 92 from the pin 90. The lip 50 may actually move slightly clockwise from the latched position shown in FIG. 3, upon engagement with the aforementioned loadbed. Accordingly, when the vehicle pulls away from the dock leveler 20, the lip 50 will then rotate about its hinge 51 toward the pendant position and will be cushioned in such movement by the effect of the counterbalance spring 82 acting on the bellcrank 62.

In the event that a substantial force is exerted on the lip 50 tending to rotate it in a counterclockwise direction, viewing FIG. 3, about its hinge 51, the spring 98 will yield allowing movement of the latch member 92 in a clockwise direction, viewing FIG. 3, causing it to disengage from the pin 90 and allowing the lip 50 to rotate toward its pendant position, thereby avoiding damage to the lip actuating mechanism as well as the lip or whatever object has forcibly engaged the lip, typically the loadbed of a vehicle being backed into position adjacent the dock 42.

Referring now to FIGS. 6 and 6A, an alternate embodiment of a latching mechanism for a dock leveler lip in accordance with the invention is illustrated wherein the lip pushrod 56 is modified to include a latch stop pin 120 suitably supported thereon at a point approximately midway between the pivot pins 58 and 60. A latch link 122 includes a recess 124 formed at one end thereof which is dimensioned to receive the pivot pin 68 for the compensating link 66. Adjacent its opposite, the latch link 122 supports a pivot pin 125 which supports a pivot member 126 on the latch link and which has a stop pin engaging surface 128 formed thereon. Latch member 126 is provided with an arm portion 126a spaced from the pivot pin 125 and connected to one end of an elongated rod 129 which extends through a suitable bore formed in a flange 130 supported on a branch portion 132 of latch link 122 and adapted to support a compression spring 98 which is trapped between the flange 130 and an adjustable nut 102 threadedly engaged with the rod 129. The latch bias springs 106 and 108 are suitably connected to the latch link 122 at the pivot pin 125, for example.

The latch bias spring 108 normally biases the latch link 122 and the latch member 126 in a position rotated clockwise about the pivot pin 68 out of engagement with the stop pin 120. However, when the ramp 33 is raised to a preparatory position and the lip 50 is rotated to its extended position by rotation of the bellcrank 62, the pushrod 56 moves to the position shown in FIG. 6 and the bias spring 106 pivots the latch link 122 into the position shown in FIG. 6 such that, when the lip 50 tends to rotate in a counterclockwise direction, viewing FIG. 6, the stop pin 120 will engage the latch surface 128 and the lip will be retained in its extended position unless a substantial bias force tends to rotate the lip against the bias of the spring 98, in which case the latch member 126 will pivot about the pivot pin 125 and disengage from stop pin 120 to allow the pushrod 56 and lip 50 to rotate toward the pendant position. Moreover, when the lip 50 engages the loadbed of a vehicle and rotates slightly further clockwise, viewing FIG. 6, and the bias spring 106 is relaxed, the bias spring 108 will pivot the latch link 122 in a clockwise direction, viewing FIG. 6, so that the latch member 126 moves out of engagement with the stop pin 120. Those skilled in the art will appreciate the operation of the latch mechanism described above and illustrated in FIG. 6 is substantially like that of the embodiment shown in FIGS. 1 through 5 with the exception that the latch mechanism may be mounted further inboard of the distal edge 34a of the deck 33.

Figure 7:
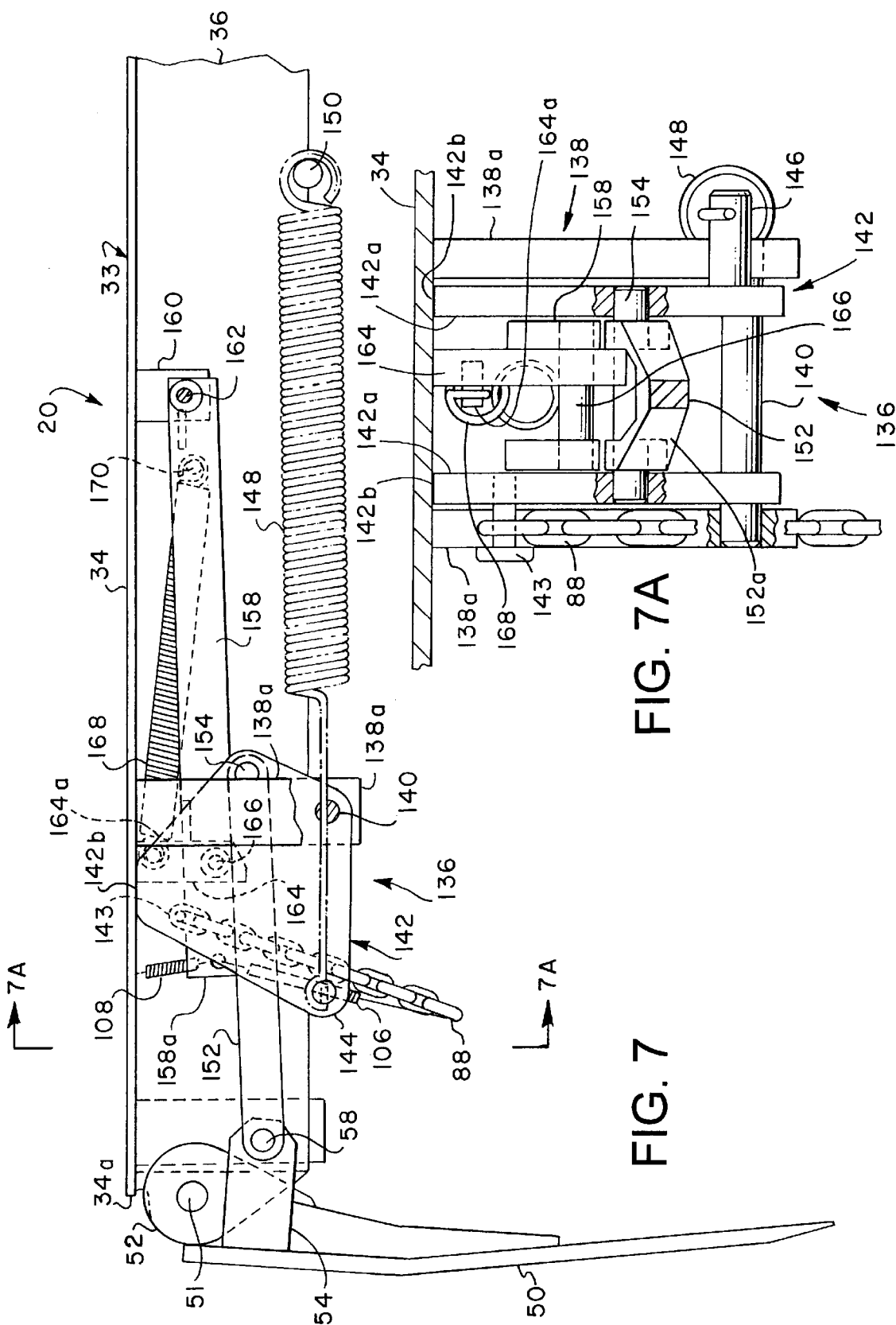
FIG. 7 is a view similar to FIG. 3 showing a second alternate embodiment of a lip extension and latch mechanism in accordance with the invention.

Referring now to FIGS. 7 and 7A, a second alternate embodiment of a lip actuating and latching mechanism in accordance with the invention is illustrated and generally designated by the numeral 136. The mechanism 136 is mounted on a dock leveler ramp 33 in place of the mechanisms described above and is operable to latch a lip 50 in an extended position upon raising the ramp to the preparatory position for engagement of a vehicle loadbed. In the embodiment illustrated in FIG. 7, the movable compensating link has been replaced by a fixed support 138 comprising spaced apart depending bosses 138a which are secured to ramp 33 and support a pivot pin 140 for a bellcrank member 142. Bellcrank 142 comprises spaced apart bellcrank members 142a providing a first leg portion 144 which supports a laterally projecting pin member 146 connected to a coil tension spring 148 at one end thereof, the opposite end of the spring 148 being secured to a support pin 150 suitably secured to at least one of the beams 36 of the ramp 33. A lip link or pushrod 152 is pivotally connected to the arm 54 at one end and at its opposite end includes a clevis part 152a pivotally connected to the bellcrank 142 at a pivot pin 154.

The bellcrank 142 is also connected to a pull chain 88 at a pin 143 spaced from the connection points of the lip pushrod and the counterbalance spring 148 such that, upon raising the ramp 33, the pull chain 88 will cause the bellcrank 142 to pivot in a counterclockwise direction, viewing FIG. 7, to pivot the lip 50 in a clockwise direction to its extended position with the assistance of the spring 148. As the bellcrank 142 moves from the position shown in FIG. 7 to the lip extended position, the line of action of the spring force from spring 148 acting on the bellcrank moves over center of the bellcrank pivot 140 to assist in moving the lip 50 to its extended position. In the position of the bellcrank 142 shown in FIG. 7, the counterbalance force of spring 148 exerts a relatively minor biasing force to hold the lip in its pendant or stored position with the bellcrank surface 142b engaged with the underside of bifurcated deckplate 34.

The mechanism 136 includes a bifurcated latch link 158 supported on the ramp 33 by a support boss 160 and a pivot pin 162 secured thereto. The latch link 158 also supports a latch member 164 for pivotal movement about a pivot pin 166 and biased to move in a clockwise direction, viewing FIG. 7, by a latch bias spring 168 connected to the latch member 164 at a connecting pin 164a and at its opposite end to the latch link 158 at a connecting pin 170. In the position of the latch member 164 and the bias spring 168 shown in FIG. 7, the spring 168 is essentially relaxed and is in a solid position, thereby holding the latch member in the position shown. Moreover, the latch mechanism illustrated in FIG. 7 includes the latch biasing springs 106 and 108 which, respectively, are connected to the latch link 158 at its distal end 158a opposite the end which is connected to the pivot pin 162. The bias spring 108 is connected to the ramp 33 and the bias spring 106 is connected to the pull chain 88 as in the previous embodiments.

When the pull chain 88 rotates the bellcrank 142 to the alternate position shown in FIG. 7, in response to elevation of the ramp 33, the latch bias spring 106 will urge the latch link 158 to pivot in a counterclockwise direction, viewing FIG. 7, until the latch member 164 is in a position to engage the pivot pin 154 in an alternate position. When the pull chain 88 and the bias spring 106 are relaxed in response to the ramp 33 declining to a working position, the weight of the lip 50 will urge the pushrod 152 to rotate the bellcrank 142 back toward the position shown in FIG. 7. However, the latch member 164 will engage the pin 154 to prevent such rotation unless a substantial biasing force overcomes the biasing force of the latch bias spring 168, thereby allowing the pin 154 and the bellcrank 142 to rotate back toward the position corresponding to the pendant position of the lip 50, as shown in FIG. 7. If the lip 50 engages the loadbed of a vehicle, not shown, and the pull chain 88 and spring 106 are in a relaxed or slack condition, the bias spring 108 will operate to retract the latch link 158 and latch member 164 to the position shown in FIG. 7 so that, after the loadbed moves away from the dock leveler, the lip 50 may pivot back to its pendant position.

Figure 8:
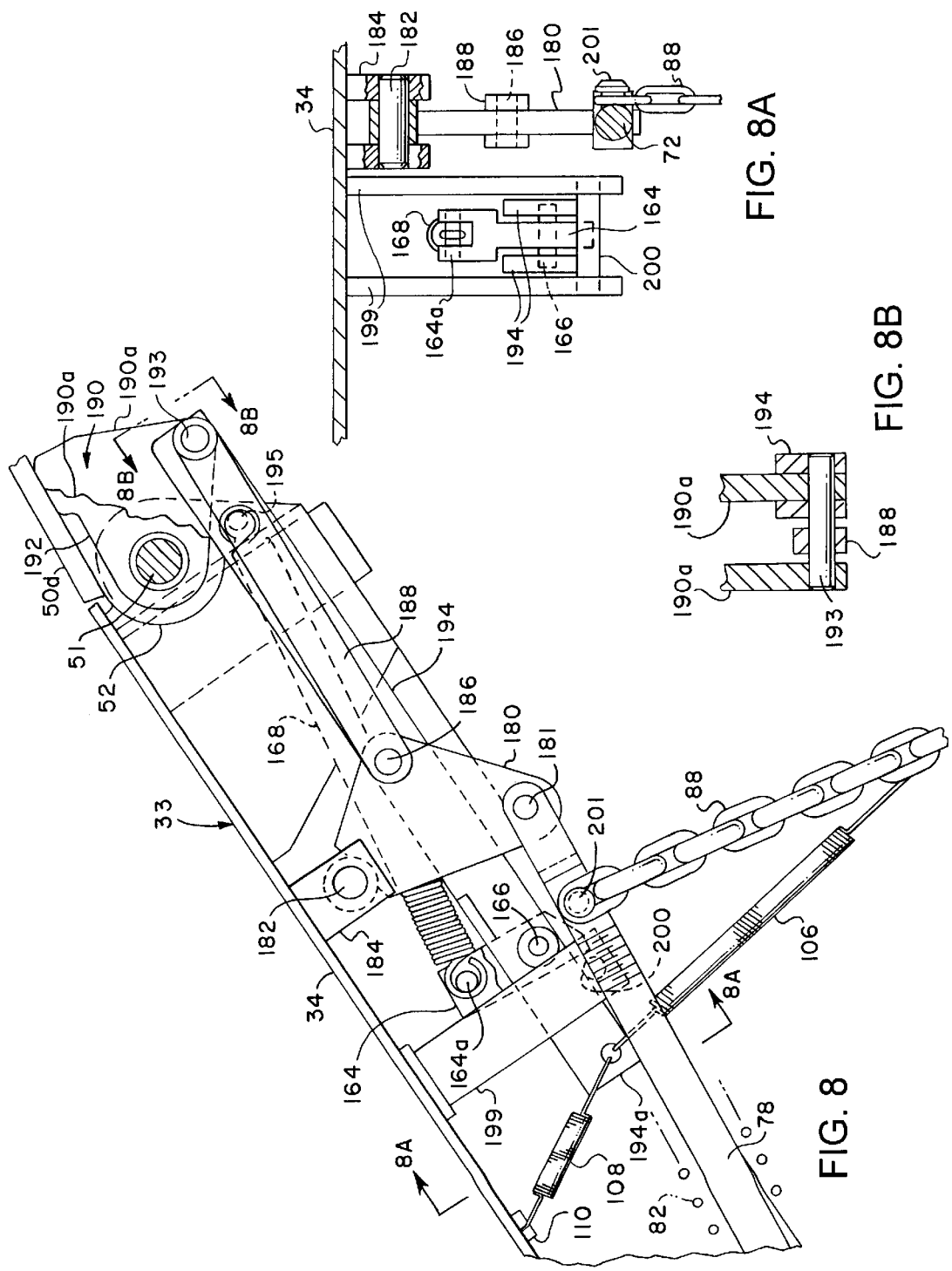
FIG. 8 is a view similar to FIG. 7, taken from the opposite direction, showing a third alternate embodiment of a latch mechanism in accordance with the invention.

Referring now to FIGS. 8, 8A and 8B, there is illustrated another embodiment of a lip extension and latching mechanism in accordance with the invention. In the embodiment of FIG. 8, a bellcrank 180 is pivotally mounted on a pivot pin 182 suitably supported on a bracket 184 fixed to the underside of the ramp 33. The bellcrank 180 includes a pivot pin 186 supported thereon at a point spaced from the pivot pin 182 and connected to one end of a pushrod 188 for rotating a bifurcated lifter 190 pivotally supported on the hinge pin 51 and including spaced apart members 190a, each having a surface 192 engageable with a modified lip 50d which is also mounted for pivotal movement on the hinge pin 51 and is otherwise similar to the lip 50. The pushrod 188 is pivotally connected to the lifter 190 at a pivot pin 193. The pivot pin 193 also pivotally supports an elongated latch link 194 for pivotal movement thereon, the opposite end 194a of the latch link being connected to the bias springs 108 and 106.

In the embodiment of FIG. 8, a latch member 164 is pivotally mounted on the latch link 194 at a pivot pin 166 and is connected to a latch bias spring 168 in generally the same manner as in the embodiment illustrated in FIG. 7. The opposite end of the bias spring 168 is connected to the link 194 at a suitable connecting pin 195. The connecting pin 195 may be placed in a selected one of spaced apart bores 194a formed in the latch link 194. The latch link 194 extends between two depending bosses 199 and is engageable with a stop pin 200 extending between and connected to the bosses 199, which stop pin is also engageable with the latch member 164 when the latch link 194 is in the position shown in FIG. 8.

In the embodiment illustrated in FIG. 8, the bellcrank 180 is also connected at a pivot pin 181, spaced from the pivot pins 182 and 186, to one end of a counterbalance spring rod 78 having a counterbalance spring 82 sleeved thereover in the same arrangement as provided for in the embodiment of FIGS. 1 through 5. The pull chain 88 is suitably connected to the counterbalance spring rod 78 at a connecting pin 201, as illustrated.

In the operation of the embodiment illustrated in FIG. 8, when the ramp 33 is elevated, the pull chain 88 will rotate the bellcrank 180 to the position shown with the assistance of the counterbalance spring 82 acting on the bellcrank through the rod 78 to raise the lip 50d to its extended position by rotating the lip lifter 190. As the pull chain 88 effects rotation of the bellcrank 180, the bias spring 106 will move the latch link 194 to the position shown so that, upon relaxation of the chain 88 and a tendency for the lip 50d to rotate in a clockwise direction, viewing FIG. 8, the latch member 164 will engage the stop pin 200 to hold the lip in the extended position. However, if a substantial force is exerted on the lip 50d, the latch member 164 will tend to rotate in a counterclockwise direction about the pivot pin 166 against the bias of the spring 168 to cause the latch mechanism to yield and allow the lip 50d to rotate about its hinge pin 51. Moreover, when the lip 50d engages the loadbed of a vehicle, upon movement of the dock leveler to the working position, slack in the chain 88 and the bias spring 106 will allow the bias spring 108 to exert a force on the latch link 194 to pivot the latch link in a clockwise direction so that the latch member 164 will be out of engagement with the pin 200 and, upon movement of the vehicle away from the lip 50d, the lip will then rotate to its pendant position against the bias of the counterbalance spring 82.

Figure 9:
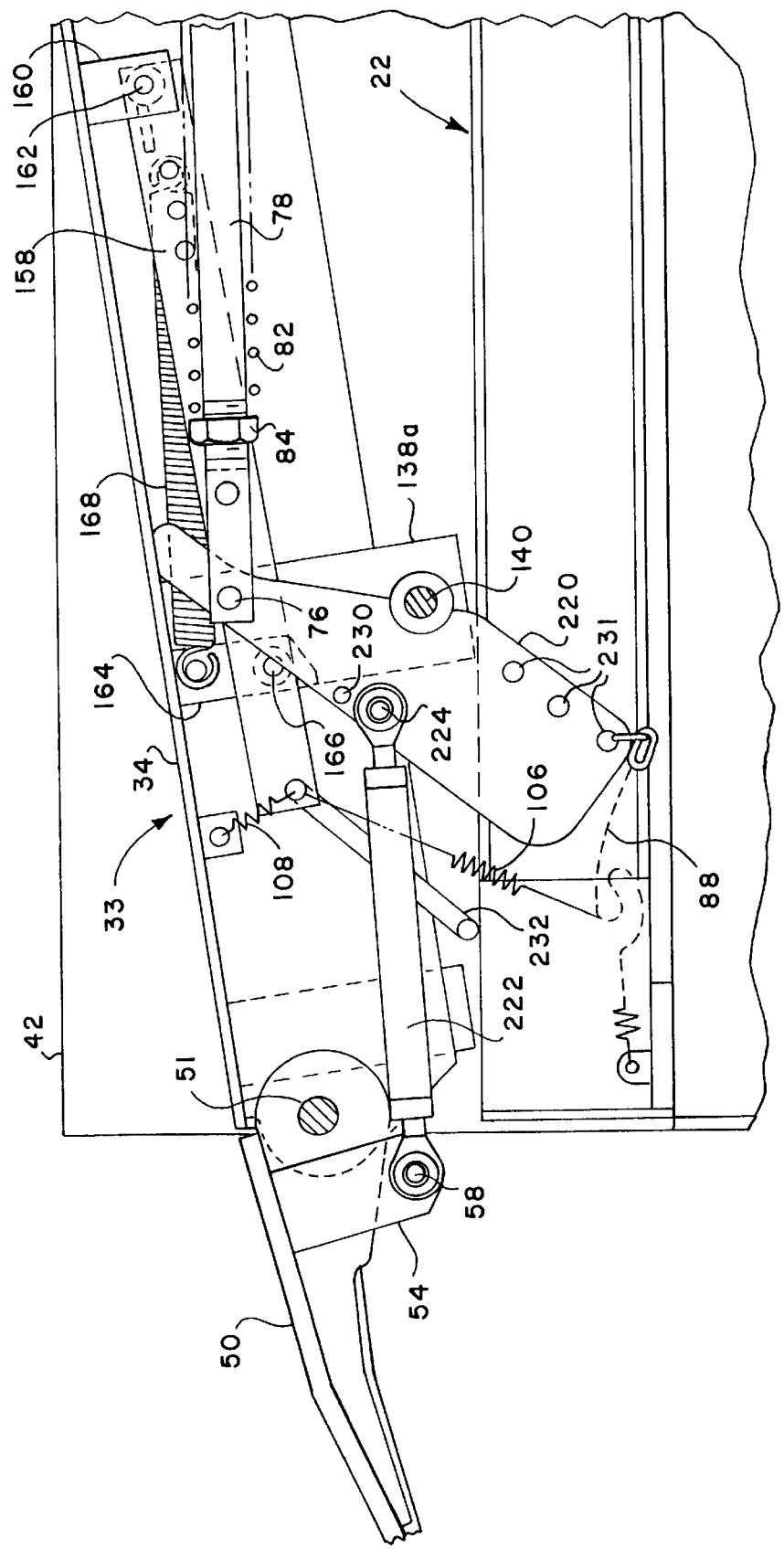
FIG. 9 is a view similar to FIGS. 3, 6 and 7 showing a fourth alternate embodiment of a latching mechanism.

Referring now to FIG. 9, there is illustrated a modification of the embodiment illustrated in FIG. 7 wherein a bellcrank 220 is substituted for the bellcrank 142. The bellcrank 220 is mounted on a pivot pin 140 supported by a depending bracket 138 secured to the comprising spaced apart bosses 138a depending from and secured to the underside of the deck 34 in a suitable manner. One of the bosses 138a is removed from drawing FIG. 9 for clarity. Pin 140 extends between bosses 138a and supports bellcrank 220 between such bosses also. An adjustable pushrod 222 is connected to the bellcrank 220 at a point spaced from the pivot pin 140 by a pivot pin 224. The opposite end of the pushrod 222 is connected to arm 54 of lip 50 at pivot pin 58.

The bellcrank 220 is also connected to a counterbalance spring rod 78 which supports a counterbalance spring 82 sleeved thereover and engageable with an adjustment nut 84 in the same manner as the embodiment of FIGS. 1 through 5. The counterbalance rod 78 is connected to the bellcrank 220 at a pivot pin 76. The mechanism illustrated in FIG. 9 includes a latch link 158, latch member 164 and latch bias spring 168 arranged in the same manner as the embodiment of FIG. 7. A stop pin 230 is supported on the bellcrank 220 and projects laterally therefrom for engagement with the latch member 164 when the lip 50 is extended and the bellcrank is rotated to the position shown.

The end of the latch link 158 opposite the end which is pivotally connected to the ramp 34 includes an extension link 232 secured thereto and extending to a position such that, if the ramp 34 is moved to a position below the surface of the dock 42, for example, as shown, the member 232 will engage the frame 22 and move the latch link 158 and latch member 164 to the position shown in FIG. 9 out of position in engagement with the latch pin 230, thereby allowing the lip 50 to move to its pendant position. Accordingly, if the ramp 33 is moved to the position shown, the lip 50 will automatically decline or depend to its pendant position upon engagement of the member 232 with the dock leveler frame and disengagement of the latch member 164 from the stop pin 230.

The operation of the embodiment of FIG. 9 is otherwise substantially similar to the embodiments of FIGS. 1 through 5 and 7. The pull chain 88 may be connected to the bellcrank 220 at selected positions indicated by the spaced apart holes 231. Latch springs 106 and 108 are also operable to move the latch link 158 in the same manner as the embodiment of FIG. 7. In the operation of the latch and lip actuating mechanism illustrated in FIG. 9, upon elevating the ramp 33 to a position preparatory to engagement of the lip 50 with a vehicle load deck, the bellcrank 220 will be rotated in a counterclockwise direction, viewing FIG. 9, as the pull chain 88 is tensioned and also with the assistance of the counterbalance spring rod 78 and counterbalance spring 82. Latch link 158 will be rotated in a counterclockwise direction about pivot pin 162 until the latch member 164 is in a position to engage the stop pin 230. As the pull chain 88 is relaxed, in response to the ramp 33 declining to a working position, the weight of the lip 50 acting through the pushrod 222 will cause the stop pin 230 to remain forcibly engaged with the latch member and, unless a substantial force is exerted on the lip 50, the lip will be retained in its extended position. However, if the ramp 33 is moved to a below-dock position as shown, should the loadbed not be present and in a position to engage the lip 50, the lip will remain extended until the member 232 engages the frame 22 and pivots the latch link 158 in a clockwise direction, viewing FIG. 9, until the latch member 164 disengages from the pin 230, at which time the weight of the lip 50 will overcome the resultant force acting on the bellcrank 220 due to the counterbalance spring and rod assembly 78, 82 and the lip 50 will descend to its pendant position.

Referring now to FIGS. 10 and 10A, another embodiment of a lip latching mechanism is illustrated wherein a modified lip 50e is pivotally connected to the distal end of ramp 33 by a hinge pin 51 and includes a fixed depending arm 54a which is pivotally connected by a pin 240 to a counterbalance spring rod 78 having a counterbalance spring 82 sleeved thereover and engaged with a nut 84. A pull chain 88 is connected to the mechanism at a pivot pin 242 supported on the rod 78 between the nut 84 and the pivot pin 240. A latch mechanism including a bifurcated link 246 comprising spaced apart interconnected link arms 246a is pivotally connected to the rod 78 at the pivot pin 242 and supports a latch member 248 for pivotal movement thereon by a pivot pin 250. A latch bias spring 252 is connected at one end to the latch member 248 and at its opposite end to the latch link 246 at a pin 246b, FIG. 10A. The latch link 246 extends between two depending brackets or bosses 138 which support a latch stop pin 140 therebetween. The latch link 246 also includes a transverse arm part 247 connected to the distal end 246a of the latch link. A latch bias spring 251 is secured at one end to a distal end 247a of the arm 247 and the spring 251 is connected at its opposite end to the ramp 33. An upstanding abutment 252 supported on the frame 22 is engageable with the arm 247, as shown in FIG. 10.

When the ramp 33 is raised to an elevated position with the mechanism shown in FIG. 10, the pull chain 88 will effect rotation of the lip 50e to its extended position with the assistance of the counterbalance spring 82 acting through the rod 78. A second latch bias spring 253 will also move the latch link 246 in a clockwise direction about its supporting pivot pin 242, viewing FIG. 10, so that, upon movement of the ramp to the preparatory position, the latch link will position itself to provide for engagement of the stop pin 140, disposed between bosses 138a, by the latch member 248. Excessive forces acting on the lip 50e will cause the latch member 248 to disengage from the stop pin 140 as the latch member moves against the bias of the spring 252. However, the weight of the lip 50e will maintain the latch member 248 engaged with the pin 140 until the lip engages the vehicle loadbed and the ramp has been positioned to allow the chain 88 to relax, as well as the bias spring 253. Accordingly, once the lip 50e engages a loadbed with the ramp in a working position, the latch member 248 will pivot upwardly under the urging of the spring 251 to disengage from the pin 140. However, if the ramp 33 should decline to the below-dock position without the lip 50e engaging a vehicle loadbed, upon engagement of the distal end 247a of the arm 247 with the abutment 252, the latch 248 will also become disengaged from the pin 140, as shown in FIG. 10, and the lip 50e will decline to the pendant position against the urging of the counterbalance spring 82.

Figure 11:
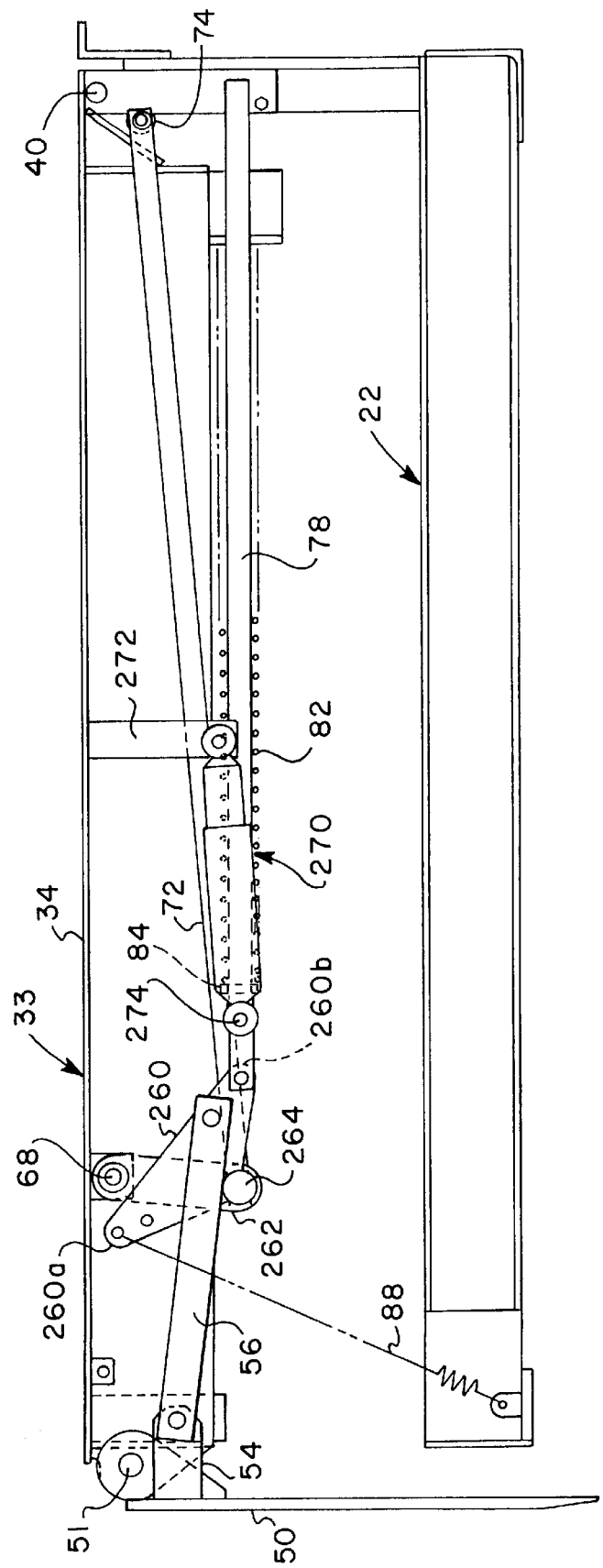
FIG. 11 is a view similar to FIG. 3 showing a sixth alternate embodiment of a lip actuating mechanism in combination with the compensating linkage.

Referring now to FIG. 11, an embodiment of a dock leveler in accordance with the invention is illustrated wherein the ramp 33, upon being elevated about its pivot or hinge pin 40, will effect extension of a lip 50 under the urging of a pushrod 56 which is connected to the lip arm 54 at a pivot 58 and at its opposite end to a bellcrank 260 pivotally supported on a compensating link 262 similar to the link 66 and supported on the ramp 33 at a pivot pin 68. The bellcrank 260 is supported on a pivot pin 264 which, in turn, is supported on a distal end of the compensating link 262. The compensating link 262 is also connected to an actuating rod 72 at one end, the opposite end of the rod 72 being connected to the frame 22 in the same manner that the rod 72 is connected to the dock leveler frame in the embodiment of FIGS. 1 through 5. A pull chain 88 is connected to the bellcrank 260 at a point 260a spaced from the pivot pin 264 and also spaced from a connecting point 260b for a counterbalance spring and rod assembly comprising a counterbalance spring 82, a rod 78 and an adjustment nut 84. In the embodiment of FIG. 11, a linearly extensible hydraulic cylinder dashpot assembly 270 is connected at opposite ends to a support 272 connected to the ramp 33 and to the counterbalance rod 78 at a connection point 274. The linearly extensible dashpot assembly 270 is operable to permit free rotation of the bellcrank 260 in a counterclockwise direction, viewing FIG. 11, as the ramp 33 is raised about its pivot pin 40 and the pull chain 88 is tensioned. Such action will, of course, also result in rotation of the lip 50 in a clockwise direction, viewing FIG. 11, from its pendant position to an extended position. As the ramp 33 is elevated, the compensating link 262 will also pivot in a counterclockwise direction about the pivot pin 68 to maintain a suitable counterbalance force acting on the lip 50 through the pushrod 56 and the bellcrank 260.

Once the lip 50 is rotated to its extended position and the hydraulic dashpot 270 has been extended, the lip 50 will tend to rotate in a counterclockwise direction against the urging of the counterbalance spring 82 and rod 78 as well as telescoping movement of the linearly extensible hydraulic dashpot, which will tend to retard the movement of the lip toward its pendant position. Accordingly, in the embodiment shown in FIG. 11, the lip 50 is assisted by a substantial counterbalance force as it moves from its pendant position toward an extended position, thanks to the compensating link 262 which supports the bellcrank 260 for limited movement as previously described in conjunction with the embodiment of FIGS. 1 through 5. Moreover, the dashpot 270 is operable to retard movement of the lip from an extended position toward a pendant position. The hydraulic dashpot 270 may, for example, be a typical automotive type hydraulic shock absorber assembly which has been modified to provide for substantially unrestricted movement when extending but to provide substantial damping of the movement of the lip 50 when the dashpot is being telescopically retracted.

Those skilled in the art will recognize from the foregoing description of the various embodiments of the lip actuating and latching mechanisms of the invention that such mechanisms provide unique features, respectively. The construction and operation of a dock leveler incorporating the respective lip actuating and latching mechanisms described is believed to be within the purview of one of ordinary skill in the art of such devices. The materials used in the construction of the various embodiments of the invention described herein may also be conventional engineering materials for dock leveler apparatus and related mechanisms.

Although preferred embodiments of the invention have been described in detail herein, those skilled in the art will recognize that various substitutions and modifications may be made to the invention without departing from the scope and spirit of the appended claims.

What is claimed is:

1. In a dock leveler including a ramp hinged to a support frame for movement between a stored position and an inclined position preparatory to forming a pathway between a vehicle loadbed and a dock, said ramp including a lip member pivotally supported on a distal end of said ramp, a lip actuating mechanism characterized by:

a bellcrank supported on said ramp and including a pivot providing for pivotal movement of said bellcrank in response to moving said ramp from said stored position to an inclined position;

a pushrod connected at one end to said lip and at an opposite end to said bellcrank for extending said lip in response to pivotal movement of said bellcrank;

a counterbalance spring operably connected to said bellcrank for urging said bellcrank in a direction of rotation to extend said lip; and a compensating link supported by said ramp for movement relative to said ramp and supporting said bellcrank for said pivotal movement of said bellcrank on said compensating link whereby, upon movement of said ramp from said stored position toward said inclined position, said compensating link and said pivot of said bellcrank move with respect to said ramp to cause said counterbalance spring to exert a compensating force related to the position of said ramp to compensate for changing lip extension force requirements encountered as said ramp moves toward said inclined position.

2. The invention set forth in claim 1 including:

a motion retarder operably connected to said bellcrank and to said ramp and operable to retard movement of said lip from said extended position toward said pendant position.

3. The invention set forth in claim 1 wherein:

said compensating link is pivotally mounted on said ramp and is connected to a compensating link rod member, said rod member being connected to said frame.

4. The invention set forth in claim 1 wherein:

said counterbalance spring is connected to an elongated counterbalance rod, said counterbalance rod being connected at one end to said bellcrank for exerting counterbalance forces thereon.

5. The invention set forth in claim 4 including:

an adjustment member supported on said rod and engageable with said counterbalance spring for adjusting spring biasing forces acting on said counterbalance rod.

6. The invention set forth in claim 1 including:

a latch mechanism operably connected to said lip and responsive to raising said lip from a pendant position to an extended position to latch said lip in said extended position.

7. The invention set forth in claim 6 wherein:

said latch mechanism includes a latch link and a latch member mounted on said latch link and engageable with a stop pin in response to raising said lip to an extended position.

8. The invention set forth in claim 7 wherein:

said latch member is engageable with yieldable biasing means operable to permit said latch member to move out of engagement with said stop pin in response to a predetermined force acting on said lip urging said lip toward a pendant position.

9. The invention set forth in claim 7 including:

a first biasing spring connected to said latch link for moving said latch link and said latch member toward engagement with said stop pin in response to moving said ramp to an inclined position and a second biasing spring connected to said latch link and to said ramp and operable to urge said latch link and said latch member to move to a position out of engagement with said stop pin.

10. The invention set forth in claim 7 wherein:

said stop pin is supported on said ramp.

11. The invention set forth in claim 7 wherein:

said stop pin is supported on said pushrod.

12. The invention set forth in claim 7 wherein:

said stop pin is supported on said bellcrank.

13. The invention set forth in claim 7 wherein:

said latch link is mounted for pivotal movement about a pivot connection between said pushrod and said lip.

14. The invention set forth in claim 7 wherein:

said latch link is mounted for pivotal movement on said ramp.

15. The invention set forth in claim 1 wherein:

said counterbalance spring is connected to said bellcrank and to said ramp in such a way as to bias said lip in a pendant position when said lip is in said pendant position and to bias said lip in an extended position when said lip is in said extended position.

16. The invention set forth in claim 7 including:

a member connected to said latch link and engageable with said frame in response to movement of said ramp to a below-dock position for causing said latch member to disengage from said stop pin.

17. In a dock leveler including a ramp hinged to a support frame for movement between a stored position and an inclined position preparatory to forming a pathway between a vehicle loadbed and a dock, said ramp including a lip member pivotally supported on a distal end of said ramp, a lip actuating mechanism characterized by:

a pushrod connected at one end to said lip and at an opposite end to a bellcrank, said bellcrank being supported on said ramp for pivotal movement in response to moving said ramp from said stored position to an inclined position to extend said lip member; and a latch mechanism operably connected to said lip and responsive to raising said lip from a pendant position to an extended position to latch said lip in said extended position, said latch mechanism including a support connected to one of said ramp and said lip, a latch link mounted on said support for pivotal movement with respect to said support and a latch member connected to said latch link and moveable with respect to said latch link and engageable with a stop pin in response to raising said lip to an extended position for holding said lip in said extended position, and said latch member is engageable with yieldable biasing means operable to permit said latch member to move out of engagement with said stop pin in response to a predetermined force acting on said lip urging said lip toward a pendant position.

18. The invention set forth in claim 17 including:

a first biasing spring connected to said latch link for moving said latch link and said latch member toward engagement with said stop pin in response to moving said ramp to an inclined position and a second biasing spring connected to said latch link and to said ramp and operable to urge said latch link and said latch member to move to a position out of engagement with said stop pin.

19. The invention set forth in claim 17 wherein:
said stop pin is supported on said ramp.

20. The invention set forth in claim 17 wherein:
said stop pin is supported on said pushrod.

21. The invention set forth in claim 17 wherein:
said stop pin is supported on said bellcrank.

22. The invention set forth in claim 17 wherein:
said latch link is mounted for pivotal movement about a pivot connection between said pushrod and said lip.

23. The invention set forth in claim 17 wherein:
said latch link is mounted for pivotal movement on said ramp.

24. The invention set forth in claim 17 including:
a counterbalance spring connected to said bellcrank and to said ramp in such a way as to bias said lip in a pendant position when said lip is in said pendant position and to bias said lip in an extended position when said lip is in said extended position.

25. The invention set forth in claim 17 including:
a member connected to said latch link and engageable with said frame in response to movement of said ramp to a below-dock position for causing said latch member to disengage from said stop pin.

26. In a dock leveler including a ramp hinged to a support frame for movement between a stored position and an inclined position preparatory to forming a pathway between a vehicle loadbed and a dock, said ramp including a lip member pivotally supported on a distal end of said ramp, a lip actuating mechanism characterized by:

a pushrod connected at one end to said lip and at an opposite end to a member operable to exert a lifting force on said lip in response to moving said ramp from said stored position to an inclined position to extend said lip member; and a latch mechanism operably connected to said lip and responsive to raising said lip from a pendant position to an extended position to latch said lip in said extended position, said latch mechanism including a support connected to one of said ramp and said lip, a latch link mounted on said support for pivotal movement with respect to said support and a latch member connected to said latch link and moveable with respect to said latch link and engageable with a stop pin in response to raising said lip to an extended position for holding said lip in said extended position, and said latch member is engageable with yieldable biasing means operable to permit said latch member to move out of engagement with said stop pin in response to a predetermined force acting on said lip urging said lip toward a pendant position.

27. The invention set forth in claim 26 including:
a first biasing spring connected to said latch link for moving said latch link and said latch member toward engagement with said stop pin in response to moving said ramp to an inclined position and a second biasing spring connected to said latch link and to said ramp and operable to urge said latch link and said latch member to move to a position out of engagement with said stop pin.

28. The invention set forth in claim 26 wherein:
said stop pin is supported on said ramp.

* * * * *